United States Patent [19]

Fukuzawa et al.

[11] Patent Number: 5,135,385
[45] Date of Patent: Aug. 4, 1992

[54] CLAMPING SYSTEM

[75] Inventors: Shigeo Fukuzawa; Takahide Kaneko; Masaaki Fujimura, all of Yamaguchi, Japan

[73] Assignee: Ube Industries, Ltd., Ube, Japan

[21] Appl. No.: 625,026

[22] Filed: Dec. 10, 1990

[30] Foreign Application Priority Data

Dec. 15, 1989 [JP] Japan .................. 1-323847

[51] Int. Cl.$^5$ .............. B29C 45/08; B29C 45/04; B29C 45/66
[52] U.S. Cl. .............. 425/595; 425/450.1; 425/451; 425/451.7; 425/589
[58] Field of Search .............. 425/450.1, 451.7, 451, 425/589, 590, 594, 595, 441, 451, 451.9

[56] References Cited

U.S. PATENT DOCUMENTS

| 3,905,741 | 9/1975 | Poncet | 425/450.1 |
| 4,315,727 | 2/1982 | Black | 425/595 |
| 4,874,309 | 10/1989 | Kushibe et al. | 425/589 |

Primary Examiner—Willard Hoag
Attorney, Agent, or Firm—Kanesaka and Takeuchi

[57] ABSTRACT

A clamping system includes a fixed platen fixed to one end of a machine base and a plurality of clamping cylinders, the fixed platen holding a fixed mold therein, a movable platen fixed to the other end of the machine base and holding a movable mold therein, a plurality of tie bars extending through the movable platen and including pistons at their one ends, the pistons being slidably received within the clamping cylinders, and screw threads or grooves substantially at their longitudinal center, a unit disposed between the movable platen and the fixed platen and operable to move the movable platen to and from the fixed platen, two-part nuts mounted to the movable platen and meshingly engageable with the screw threads or grooves of the tie bars, and stoppers each of which is engaged with a recess provided on each of the tie bars mounted to the movable platen on the side opposite to the fixed platen characterized in that screws are threaded at end portions of the tie bars on the side of the fixed platen, screws engageable with the end portion screws on the tie bars are tapped on the inner circumference surface of the pistons so that the pistons may be rotatable through connecting means which is connected with a drive on the outer circumference surface of the pistons, and driving medium introducing chambers are provided so that the pistons may slide forward and backward.

6 Claims, 4 Drawing Sheets

CLAMPING SYSTEM

FIELD OF THE INVENTION AND RELATED ART STATEMENT

The present invention relates to a clamping system for use in an injection molding machine, a die casting machine, a press, etc.

FIGS. 3 and 4 are longitudinal sectional views of a clamping system as disclosed in Japanese Utility Model Application No. SHO 63-114970 filed on Sept. 2, 1988 [published on Mar. 9, 1990 as publication (Kokai) No. 2-36411] prior to the filing date of the present application. The related application is described below with reference to FIGS. 3 and 4.

In FIG. 3, the prior art clamping system generally includes a fixed platen 10, a movable platen 20, tie bars 7, two-part nuts 22, nut boxes 21, a connecting plate 50, clamping cylinders 3, approaching cylinders 2, a fixed or female mold 30a, a movable or male mold 30b, stopper boxes 33, compression springs 32, rollers 36, and stoppers 34.

More specifically, the fixed mold 30a is mounted to the fixed platen 10 which is, in turn, fixed to one end of a machine base 1. The movable mold 30b is mounted to the movable platen 20 which is, in turn, located at the other end of the machine base 1. The approaching cylinders 2 are fixed to the fixed platen 10. Each of the piston rods 6 has one end connected to the movable platen 20 and can reciprocatingly slide on the machine base 1 with respect to the fixed platen 10. A plurality of (in this case, four) tie bars 7, each of which has the same diameter through its length, extends through the movable platen 20. Each of the tie bars 7 has one end connected to a piston 5 slidable within each of the clamping cylinders 3 and the other end extending substantially vertically through the connecting plate 50 and secured thereto by a nut or end plate 51. Keys, etc. are used to prevent rotation of the tie bars 7 in relation to the connecting plate 50. The tie bars 7 have screw threads or grooves 8 substantially at their center, which come into mesh with the two-part nuts 22 so as to lock the movable platen 20 onto the tie bars 7. Formed at the back of each of the screw threads or grooves 8 is a recess 9 which includes a stopper surface 9a containing a line extending at right angles to from the stopper surface 9a toward the movable platen 20. The stoppers 34 are contained in the stopper boxes 33 which are, in turn, fixed to the movable platen 20. Each of the stoppers 34 is normally pressed in a direction at right angles to the axis of the tie bar 7 or against the bottom of the recess 9. The stopper 34 is slidable on the inclined surface 9b and can be brought into contact with the stopper surface 9a of the recess 9.

As shown in FIG. 4, there are provided the stopper boxes 33, the compression springs 32, the stoppers 34, the shafts 31, the bushes 35 and the rollers 36.

Specifically, each of the stoppers 34 is slidable vertically within the stopper box 33. The vertical shaft 31 has one end connected to the stopper 34 and the other end extending upwardly through the stopper box 33. Each of the rollers 36 is rotatably supported by a support shaft 36a which is mounted to the lower portion of the stopper 34. The roller 36 is normally pressed against the tie bar 7 by the compression spring 32 and movable axially along the tie bar 7 upon movement of the movable platen 20.

Each of the two-part nuts 22 is incorporated in the nut box 21 which is fixedly mounted to the movable platen 20. When the molds are clamped, the two-part nuts 22 are brought into meshing engagement with the screw threads or grooves 8 of the tie bars 7 by a hydraulic unit (not shown).

In a clamping system with the arrangement referred to above, hydraulic oil is first introduced into an oil chamber 4a of each of the approaching cylinders 2 so as to cause the movable platen 20, together with the nut boxes 21 and the stopper boxes 33 mounted thereto, to move toward the fixed platen 10 along the tie bars 7. At this time of movement, the rollers 36 which are rotatably supported by the support shafts 36a at the tip portions of the stoppers 34 are rotationally moved along the tie bars 7 toward the fixed platen 10. During the movement of the movable platen 20 toward the fixed platen 10, the screw threads or grooves 8 formed substantially at the center of the tie bars 7 go through the through holes 24 of the movable platen 20. Also, while the movable platen 20 is approaching the fixed platen 10 by the operation of the approaching cylinders 2, the two-part nuts 22 are gradually moved toward the surface of the tie bars 7. Then, the nut boxes 21 fixedly mounted adjacent to the movable platen 20 pass through the recesses 9 of the tie bars 7. Next, when the stopper boxes 33 approach the recesses 9, the stoppers 34 which are pressed by the compression springs 32 go into the recesses 9 and the front faces of the stoppers 34 come into contact with the corresponding stopper surfaces 9a of the recesses 9. By this, the movable platen 20 is stopped in relation to the tie bars 7. The two-part nuts 22 are in a predetermined positions in relation to the tie bars 7. In this state, if the two-part nuts 22 are moved toward the screw threads or grooves 8, the two-part nuts 22 are brought into exactly meshing engagement with the screw threads or grooves 8. It is thus possible that the two part nuts 22 are fastened and for certain brought into meshing engagement with the screw threads or grooves 8 on the tie bars 7. When the meshing engagement of the two-part nuts 22 with the screw threads or grooves 8 is accomplished, clamping by the clamping cylinders 3 between the movable mold 30b and the fixed mold 30a is ready to begin. A further supply of hydraulic oil to the oil chambers 4a of the approaching cylinders 2 causes the movable mold 30b to move closer to the fixed mold 30a. Finally, the movable mold 30b comes into light contact with the fixed mold 30a. After that, hydraulic oil is introduced into oil chambers 5a of the clamping cylinders 3 fixedly mounted to the fixed platen 10 to initiate strong clamping of the molds. Under the circumstances, injection molding is carried out.

In the conventional clamping system, clamping cylinders having a long stroke are provided on the side of the fixed platen. As the length of the stroke of the clamping cylinders, there requires the length which is the sum of the mold release stroke for releasing the movable mold from the fixed mold, the mold thickness adjusting stroke necessary for adjustment in case the thickness of the molds (also called as die height) when both the fixed mold and the movable mold come into contact with each other is different, and the pressure rise stroke when both the molds are clamped from the state of the light contact with each other.

Among the three kinds of strokes as above referred to, the mold thickness adjusting stroke affects most the length of the stroke of the clamping cylinders. As this mold thickness adjusting stroke is long, there are problems that a large amount of hydraulic oil is necessary and that it takes a long time to raise the pressure.

OBJECT AND SUMMARY OF THE INVENTION

It is an object of the present invention to provide a clamping system characterized in that, as it is formed to have mold release stroke and pressure rise stroke, it requires a short stroke of clamping cylinder, it requires only a small amount of hydraulic oil, and thus time necessary for raising the pressure can be short, and which is simple in mechanism and operation as tie bars are axially moved only by rotating pistons engaged with sprockets in order to adjust the thickness of molds.

According to the present invention, a clamping system includes a fixed platen fixed to one end of a machine base and a plurality of clamping cylinders, the fixed platen holding a fixed mold therein; a movable platen fixed to the other end of the machine base and holding a movable mold therein; a plurality of tie bars extending through the movable platen and including pistons at their one ends, the pistons being slidably received within the clamping cylinders, and screw threads or grooves substantially at the longitudinal center of the tie bars; a unit disposed between the movable platen and the fixed platen and operable to move the movable platen to and from the fixed platen; two-part nuts mounted to the movable platen and meshingly engageable with the screw threads or grooves of the tie bars; and stopper means engageable with recesses on the tie bars provided at the movable platen on the opposite side to the fixed platen. Screws are threaded on the tie bars adjacent to their end portions on the side of the fixed platen, screws which are engageable with the end portion screws on the tie bars are provided on the inner peripheral surface of the pistons so that the pistons may be rotatable through connecting means which is connected to a drive on the outer circumference surface of the pistons, and further, driving medium introducing chambers are provided so that the pistons may slide forward and backward.

With this arrangement, according to a clamping signal, the movable mold moves on the tie bars toward the fixed platen together with the movable platen, the movable mold is pressed against the fixed mold supported by the fixed platen, and clamping can be carried out. When the movable platen goes forward and backward along the tie bars, as the inner circumference surface of the movable platen slides on the outer circumference surface of the tie bars which tie bars extend through the movable platen, the function of smoothly guiding the movable platen on the tie bars can be properly and enough attained. Further, the stoppers of stopper boxes fixedly provided at the movable platen automatically go in recesses of the tie bars around the time the clamping is finished and come into contact and are engaged with the recesses. By this, the two-part nuts are correctly meshed with the screw threads or grooves of the tie bars. Further, when the clamping is operated, while the movable platen is made to approach the fixed platen by the approaching cylinders, the operation of meshing the two-part nuts with the screw threads or grooves of the tie bars is done at the same time. By this, when the stroke of the approaching cylinders is finished, clamping can be carried out only by introducing hydraulic oil to oil chambers on the side of the tie bars. As necessary stroke is small, only a small amount of hydraulic oil is necessary, and time necessary for raising the pressure of hydraulic oil becomes short. The mold thickness adjusting stroke can be adjusted by moving the tie bars forward and backward through the pistons by means of rotating the sprockets, and change in the thickness of the molds can be easily dealt with.

BRIEF DESCRIPTION OF THE DRAWINGS

A better understanding of the invention may be had by reference to the following description of preferred embodiments when taken in conjunction with the accompanying drawings, in which.

DESCRIPTION OF THE PREFERRED EMBODIMENTS

Figure 1:
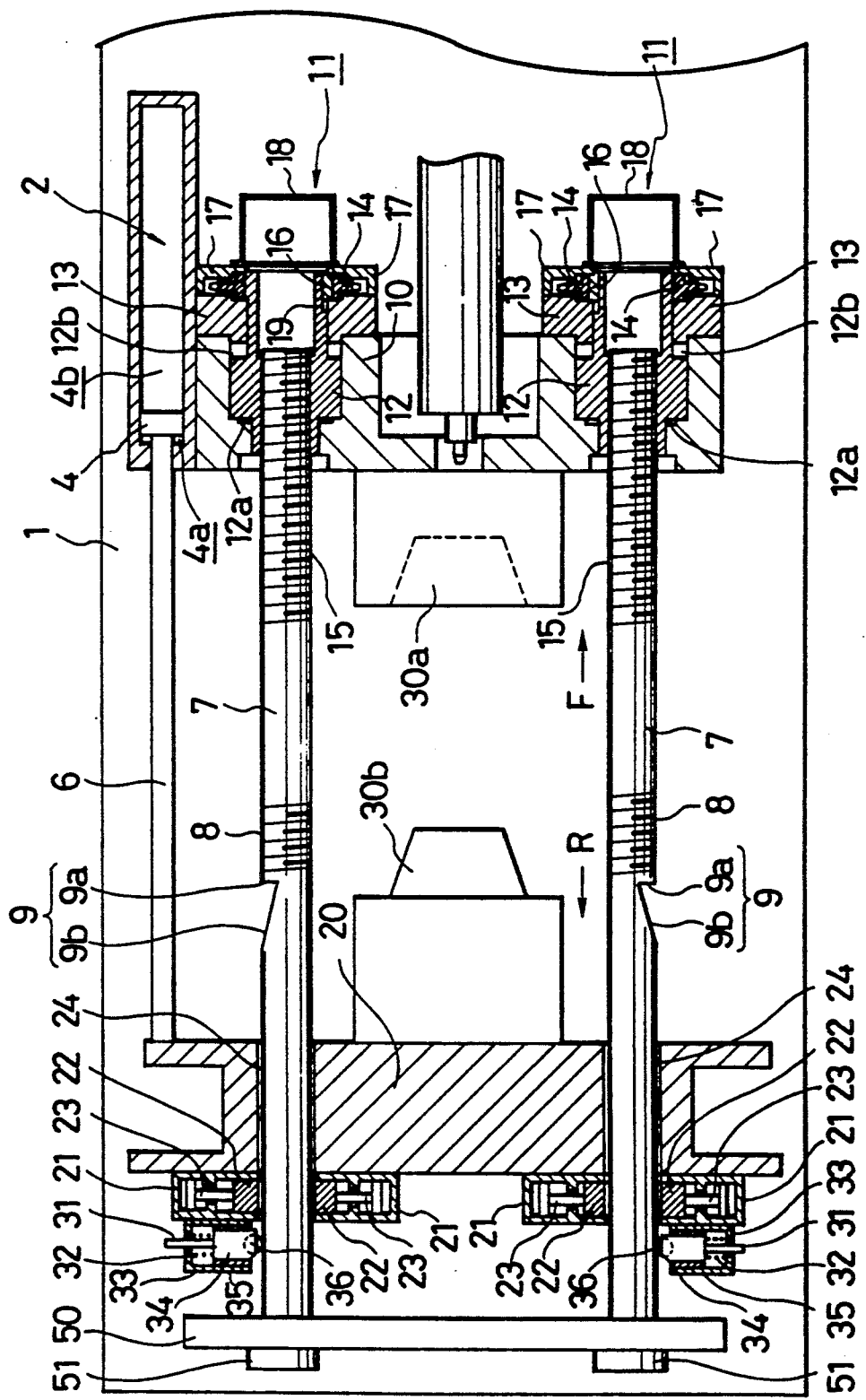
FIG. 1 is a longitudinal sectional view of the clamping system of the invention.
Figure 2:
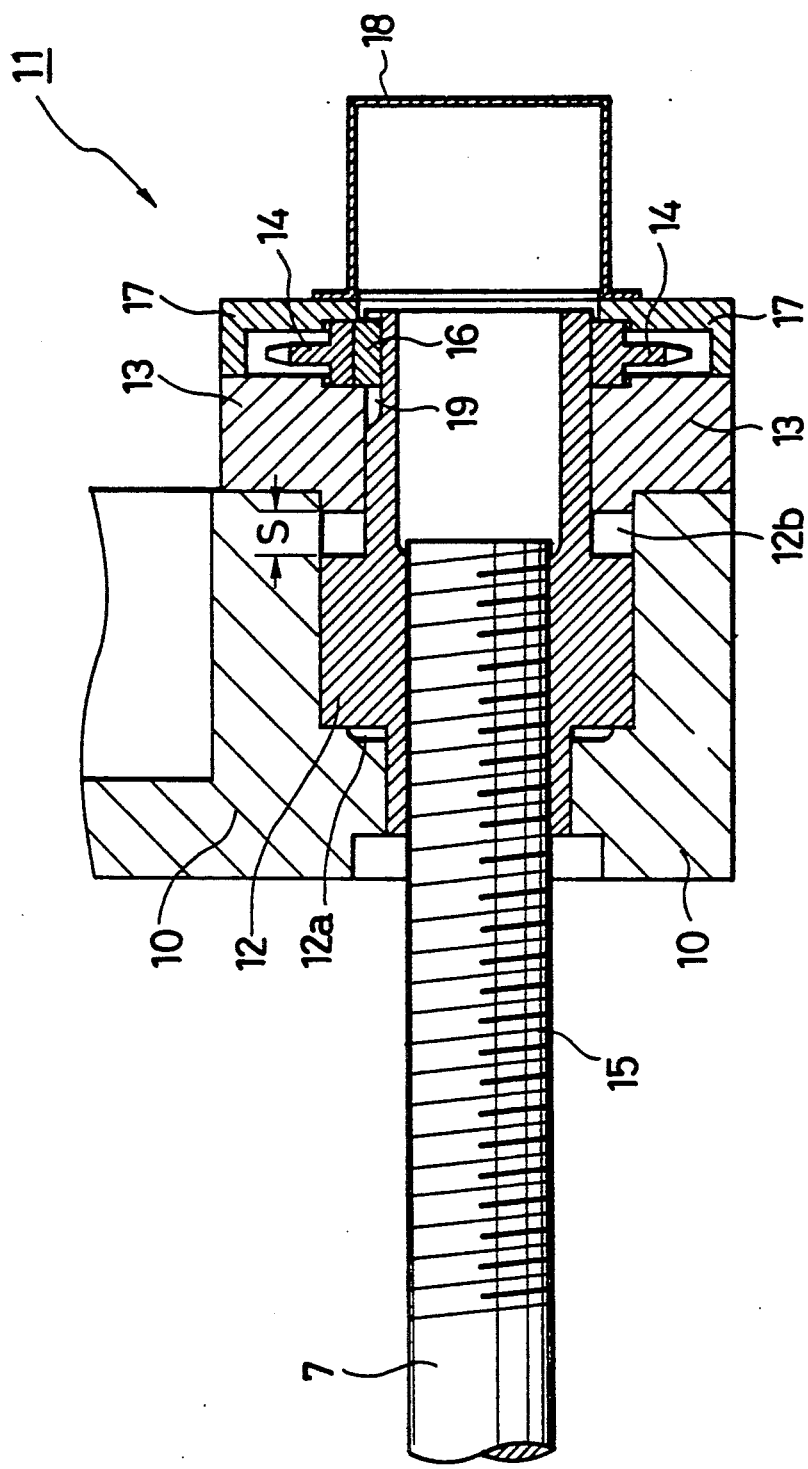
FIG. 2 is a longitudinal sectional view of the clamping adjusting apparatus disposed on a fixed platen of the invention.

FIGS. 1 and 2 show a clamping system according to one embodiment of the present invention. FIG. 1 is a longitudinal sectional view of the clamping system. FIG. 2 is a longitudinal sectional view of a clamping adjusting apparatus disposed on a fixed platen.

The present invention will now be described by way of example with reference to FIGS. 1 and 2.

With reference to FIG. 1, a clamping system generally includes approaching cylinders 2, tie bars 7, a fixed platen 10, a movable platen 20, clamping adjusting apparatus 11, two-part nuts 22, nut boxes 21, a connecting plate 50, a fixed mold 30a, a movable mold 30b, stopper boxes 33, compression springs 32, rollers 36, and stoppers 34.

Specifically, the fixed mold 30a is mounted to the fixed platen 10 which is, in turn, fixed to one end of a machine base 1. The movable mold 30b is mounted to the movable platen 20 which is, in turn, located at the other end of the machine base 1 so as to face the fixed platen 10. The approaching cylinders 2 are fixedly mounted to opposite sides of the fixed platen 10. Each of the piston rods 6 has one end connected to the movable platen 20 and can reciprocatingly slide on the machine base 1 with respect to the fixed platen 10. An arrow F indicates a forward direction and an arrow R indicates a rearward direction. A plurality of tie bars 7 (in the illustrated embodiment, the number of the tie bars is four), each having the same diameter through its length, extends through the movable platen 20. Each of the tie bars 7 has one end connected to the clamping adjusting apparatus 11 mounted on the fixed platen 10 and the other end extending through the connecting plate 50 and secured thereto by a nut or end plate 51. Keys, etc. are used to prevent rotation of the tie bars 7 relative to the connecting plate 50.

A clamping adjusting apparatus 11 of the present invention includes a piston 12, a cylinder head cover 13, a sprocket 14, a screw portion 15, a sliding key 16, a sprocket cover 17, a tie bar cover 18, and a key way 19.

The piston 12 is like a cylinder. A female screw is tapped on the inner circumference surface of the piston 12 on the side of the movable platen 20 so as to be meshed with the screw portion 15 threaded at the end portion of the tie bar 7. The sprocket 14 is disposed at an outer circumference portion of the piston 12 on the side opposite to the movable platen 20.

The sprocket 14 is engaged with the key way 19 through the sliding key 16 which key way 19 is notched at the end portion of the piston 12. The sprocket 14 is surrounded by the cylinder head cover 13 and the sprocket cover 17 and therefore, can not move to the right and to the left.

The length of the key way 19 corresponds with the length of movement of a stroke shown as S in FIG. 2. A chain connects the sprocket 14 with a sprocket fixedly attached to an output shaft of a motor (not shown). The chain is driven by the rotation of the motor and the piston 12 can be thus rotated.

Driving medium introducing chambers are provided in front of and at the back of the piston 12. In the present embodiment, oil chambers 12a and 12b are the driving medium introducing chambers and oil is the driving medium. The oil chamber 12a is provided on the rear end side of the piston 12 and the oil chamber 12b is provided on the front end side of the piston 12. The maximum stroke S is formed by the limit of going forward and the limit of going backward of the piston 12. When the piston 12 is rotated, if there is a gap in front of or at the back of the piston 12, the piston 12 moves along the tie bars 7 by the length of the gap. If the piston 12 being in contact with the end face of the oil chamber 12a or 12b is rotated, the tie bars axially go forward or backward.

The necessary stroke S for the piston 12 is a mold release stroke $S_1$ when the mold 30b is released from the fixed mold 30a plus a pressure rise stroke $S_2$ when the molds come into the clamping state from the state of light contact with each other ($S_1 + S_2$). When the mold release stroke $S_1$ is necessary, if hydraulic oil is introduced to the oil chamber 12b, the piston 12 moves to the left in FIG. 2, the movable platen 20 goes backward through the tie bars 7, and the fixed mold 30a is released from the movable mold 30b and releasing of the molds is carried out.

When clamping operation is necessary, hydraulic oil is introduced to the oil chamber 12a. Then, the piston 12 moves to the right in FIG. 2, the movable platen 20 goes forward through the tie bars 7, the fixed mold 30a is pressed strongly against the movable mold 30b, and clamping can be carried out. When molds of different die heights (the thickness of the molds) are adopted, the sprocket 14 is rotated by the chain which is not shown and the tie bars 7 are axially moved. When the thickness of both the molds is thick, the tie bars 7 are moved to the left in FIG. 1 and the movable platen 20 is moved to the left. When the thickness of both the molds is thin, the tie bars 7 are moved to the right and the movable platen 20 is moved to the right of FIG. 1.

When the thickness of the molds is considerably thin, the tips of the tie bars 7 protrude over the rear face of the fixed platen 10. The tie bar cover 18 is provided so as to secure the safety in operation even in this kind of case.

Figure 3:
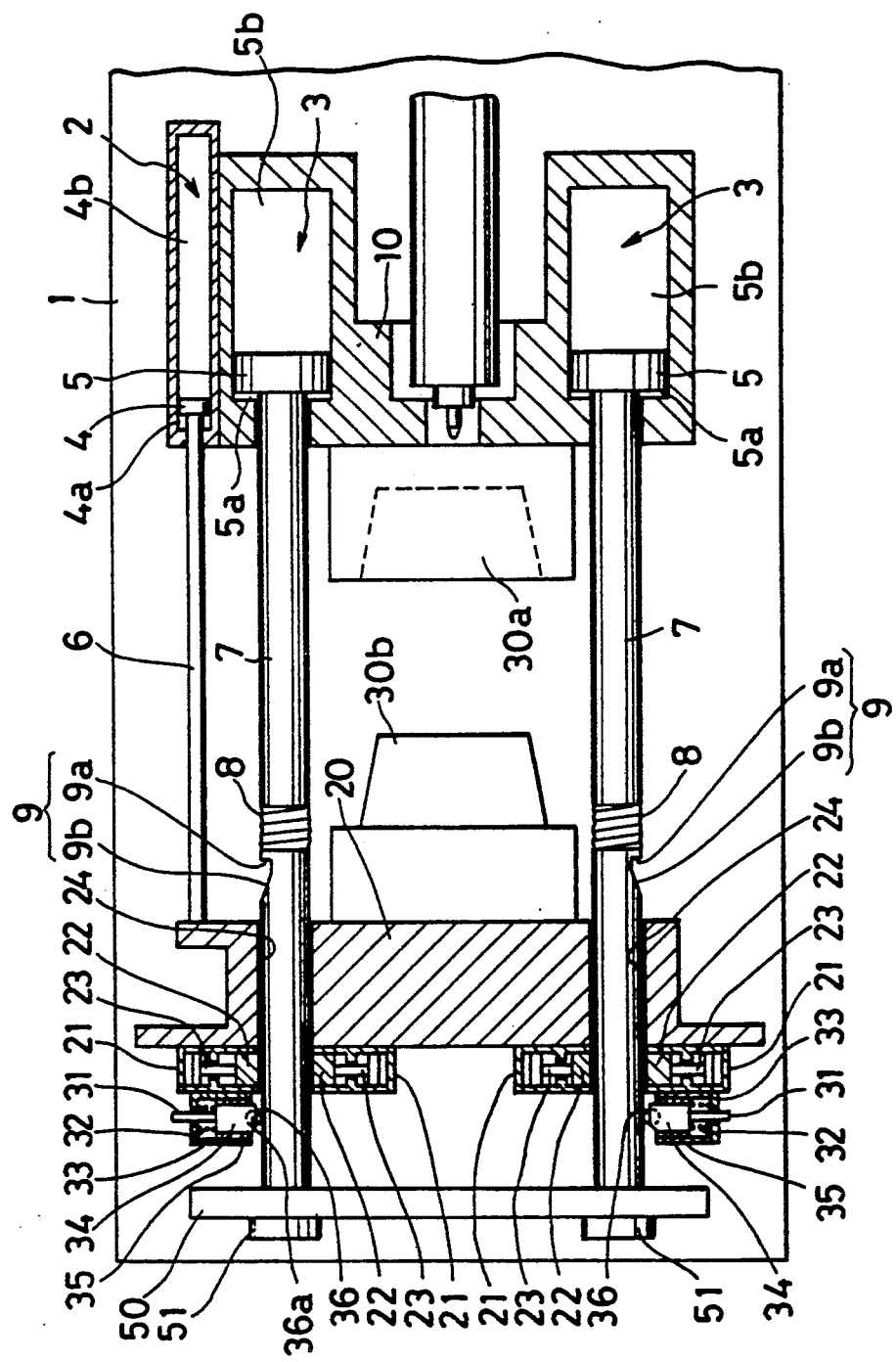
FIG. 3 is a longitudinal sectional view of the related system.
Figure 4:
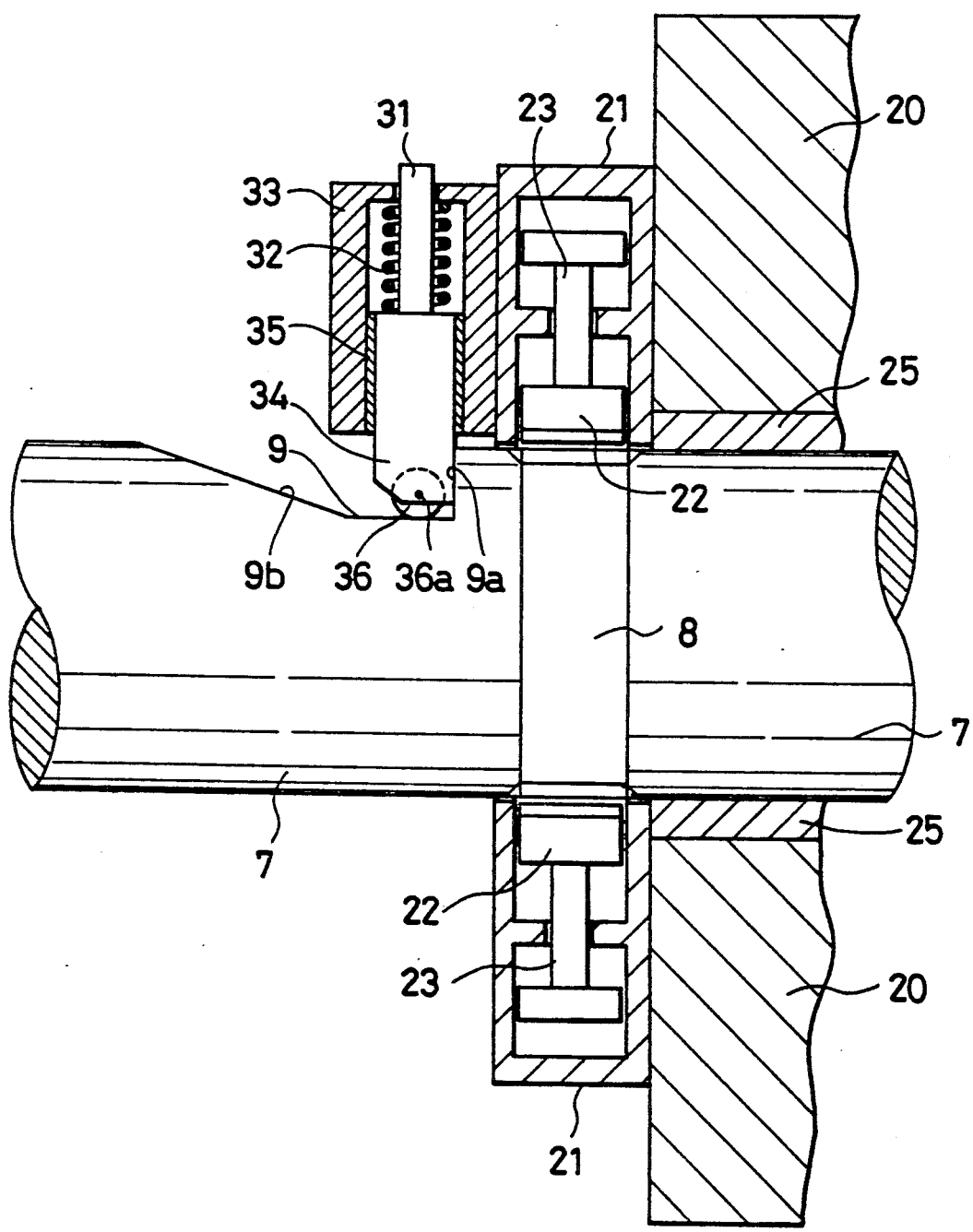
FIG. 4 is a longitudinal sectional view showing a portion around a stopper of the related system.

Others in the structure are the same as that shown in FIGS. 3 and 4. Like numbers designate the like parts. That is, the tie bars 7 have screw threads or grooves 8 substantially at their center, which come into mesh with the two-part nuts 22 so as to lock the movable platen 20 onto the tie bars 7. Formed at the back of each of the screw threads or grooves 8 is a recess 9 which includes a stopper surface 9a containing a line extending at right angles to the axis of the tie bar 7 and an inclined surface 9b extending from the stopper surface 9a toward the movable platen 20. The stoppers 34 are contained in the stopper boxes 33 which are, in turn, fixed to the movable platen 20. Each of the stoppers 34 is normally pressed in a direction at right angles to the axis of the tie bar 7 or against the bottom of the recess 9. The stopper 34 is slidable on the inclined surface 9b and can be brought into contact with the stopper surface 9a of the recess 9.

There are provided the stopper boxes 33, the compression springs 32, the stoppers 34, the shafts 31, the bushes 35 and the rollers 36. Specifically, each of the stoppers 34 is slidable vertically within the stopper box 33. The vertical shaft 31 has one end connected to the stopper 34 and the other end extending upwardly through the stopper box 33.

Each of the rollers 36 is rotatably supported by a support shaft 36a which is mounted to the lower portion of the stopper 34. The roller 36 is normally pressed against the tie bar 7 by the compression spring 32 and movable axially along the tie bar 7 upon movement of the movable platen 20.

Each of the two-part nuts 22 is incorporated in the nut box 21 which is fixedly mounted to the movable platen 20. When the molds are clamped, the two-part nuts 22 are brought into meshing engagement with the screw threads or grooves 8 of the tie bars 7 by a hydraulic unit (not shown) mounted in the nut box 21.

Operation of the clamping system of the present invention will now be described.

In order to clamp the molds together, hydraulic oil is first introduced into the oil chambers 4a of the approaching cylinders 2. This causes the movable platen 20 together with the nut boxes 21 and the stopper boxes 33 fixed thereto to move toward the fixed platen 10 along the tie bars 7. At this time, rollers 36 supported at the tip portions of the stoppers 34 are rotatingly moved on the tie bars 7.

The screw threads or grooves 8 formed substantially at the center of the tie bars 7 are smoothly inserted into and then, pass through the through holes 24 of the movable platen 20. In this way, while the movable platen 20 is made to approach the fixed platen 10 by means of the approaching cylinders 2, the operation of meshing quickly the two-part nuts 22 with the screw threads or grooves 8 of the tie bars 7 is carried out at the same time. The nut boxes 21 fixedly provided adjacent to the movable platen 20 pass through the recesses 9 of the tie bars 7. Next, the front faces of the stoppers 34 pressed by the compression springs 32 from the inside of the stopper boxes 33 come into contact with the stopper surfaces 9a of the recesses 9. After that, the two-part nuts 22 are meshed with the screw threads or grooves 8 on the tie bars 7. After this meshing is finished, clamping of the movable mold 30b and the fixed mold 30a is ready to begin. Thereafter, hydraulic oil is supplied to the oil chambers 12a of the clamping adjusting apparatus 11 fixedly provided at the fixed platen 10 so as to initiate strong clamping of the two molds. In this state, injection molding takes place.

Reverse operation permits the movable platen 20 to move away from the fixed platen 10 or separate the two molds 30a and 30b from one another.

In the present invention, the sprockets 14 are used, but instead, gears, etc. may be used. Further, the sliding keys 16 are used in order to prevent sliding of the piston 12 and the sprockets 14, but instead, splines, etc. may be used.

Although the preferred embodiments of the present invention have been described in detail, it will be appreciated that the invention is not limited thereto, and various modifications and changes may be made therein without departing from the spirit of the invention and the scope of the appended claims.

What is claimed is:

1. A clamping system comprising:
   a fixed platen for holding a fixed mold, said fixed platen being fixedly mounted to one end of a machine base and having a plurality of clamping cylinders;
   a movable platen for holding a movable mold, said movable platen being fixed to the other end of said machine base and movable to and from said fixed platen;
   pistons each of which is slidably provided in each of said clamping cylinders and is formed by one end of each of a plurality of tie bars, said tie bars extending through said movable platen;
   screw portions each of which is formed at a substantially longitudinal center of each of said tie bars;
   means for moving said movable platen to and from said fixed platen;
   two-part nuts which are mounted to said movable platen and engageable with said screw portions on said tie bars; and
   stopper means each of which is engaged with a recess provided on each of said tie bars mounted to said movable platen on the side opposite to said fixed platen, wherein screws are threaded at end portions of said tie bars on the side of said fixed platen, screws engageable with said end portion screws on said tie bars are tapped on the inner circumference surface of said pistons so that said pistons may be rotatable through connecting means which is connected with a drive on the outer circumference surface of said pistons, and driving medium introducing chambers are provided so that said pistons may slide forward and backward.

2. A clamping system comprising:
   a fixed platen for holding a fixed mold, said fixed platen being fixedly mounted to one end of a machine base and having a plurality of clamping cylinders;
   a movable platen for holding a movable mold, said movable platen being fixed to the other end of the machine base and movable to and from said fixed platen;
   said plurality of cylinders each defining a cylinder bore therein;
   a plurality of tie bars one end of each of which extends through said movable platen and the outer circumference surface of the other end of each of which has a male screw;
   cylinder-like pistons each of which is slidable within said cylinder bore and has a female screw provided on the inner circumference surface that is meshed with said male screw of each of said tie bars;
   screw threads or grooves each of which is formed at a substantially longitudinal center of said tie bar;
   means for moving said movable platen to and from said fixed platen;
   a plurality of two-part nuts mounted to said movable platen and engageable with said screw threads or grooves of said tie bars, said two-part nuts being movable to and from said tie bars;
   means for moving said plurality of two-part nuts to and from said tie bars; and
   means for rotating said pistons around their axes;
   whereby said tie bars are moved forward or backward by rotating said pistons according to the thickness of said movable mold and fixed molds.

3. A clamping system according to claim 2, wherein said means for rotating said pistons comprises:
   sprocket wheels fixed to said pistons;
   endless-loop-like chains which are hung on said sprocket wheels;
   other sprocket wheels on which said chains are hung; and
   a motor for rotating said other sprocket wheels.

4. A clamping system comprising:
   a machine base,
   a fixed platen fixedly mounted on the machine base and having a fixed mold and a plurality of clamping cylinders,
   a movable platen fixed to the machine base to be movable relative to the fixed platen, said movable platen having a movable mold;
   a plurality of tie bars extending from the fixed platen and passing through the movable platen, each tie bar having an outer surface with a male screw at a side of the fixed platen and grooves at a center area thereof,
   means for moving said movable platen relative to the fixed platen along the tie bars,
   means for fastening the movable platen to the tie bars, said fastening means being fixed to the movable platen and operating so that when the movable platen is moved at a predetermined position by means of said moving means, said fastening means engages the grooves on the tie bars to immovably fix the movable platen to the tie bars,
   a plurality of pistons rotatably retained in the clamping cylinders of the fixed platen, each piston being moved in the direction parallel to the tie bars when tightening the movable mold to the fixed mold and having a female screw meshing the male screw of the tie bar, and
   means for rotating the pistons attached to the fixed mold, said rotating means, when operated, moving the tie bars relative to the fixed platen to thereby adjust a distance between the movable mold and the fixed mold.

5. A clamping system according to claim 4, wherein said fastening means includes a plurality of two-part nuts mounted on the movable platen and engageable with the grooves on the tie bars, and means for moving the two part nuts relative to the tie bars to engage with and disengage from the tie bars.

6. A clamping system according to claim 4, wherein said rotating means includes key threads formed on the pistons along the longitudinal direction of the pistons, sprocket wheels engaging the key threads of the pistons, and means for rotating the sprocket wheels so that when the rotating means is actuated, the pistons rotate to move the tie bars relative to the fixed platen to thereby adjust a position of the movable mold to the fixed mold.

* * * * *